US005404318A

United States Patent [19]

Hoffert et al.

[11] Patent Number: 5,404,318

[45] Date of Patent: Apr. 4, 1995

[54] TEST MODE READBACK IN A MEMORY DISPLAY INTERFACE

[75] Inventors: Bradley W. Hoffert, Mt. View; Craig Forrest, San Francisco; Shawn F. Storm, Mt. View, all of Calif.

[73] Assignee: Sun Microsystems, Inc., Mountain View, Calif.

[21] Appl. No.: 983,779

[22] Filed: Dec. 1, 1992

[51] Int. Cl.[6] .......... G01B 7/00

[52] U.S. Cl. .......... 364/551.01; 364/571.07; 364/571.04

[58] Field of Search .......... 371/22.1, 40.1, 25.1; 395/162, 166, 161; 364/551.01, 571.07, 571.04

[56] References Cited

U.S. PATENT DOCUMENTS

| | | | |
|---|---|---|---|
| 4,821,269 | 4/1989 | Jackson et al. | 371/22.1 |
| 4,955,024 | 9/1990 | Pfeiffer et al. | 371/40.1 |
| 5,051,816 | 9/1991 | Harrison et al. | 371/25.1 |
| 5,255,359 | 10/1993 | Ebbers et al. | 395/161 |
| 5,274,760 | 12/1993 | Schneider | 395/162 |

*Primary Examiner*—Emanuel T. Voeltz
*Assistant Examiner*—Thomas Peeso
*Attorney, Agent, or Firm*—Blakely Sokoloff Taylor & Zafman

[57] ABSTRACT

A test mode read back function for verifying the functions of the memory display interface and a VRAM frame buffer coupled to the memory display interface, wherein the memory display interface implements programmable pixel rates and pixel depths, and programmable pixel processing functions.

22 Claims, 4 Drawing Sheets

TEST MODE READBACK IN A MEMORY DISPLAY INTERFACE

BACKGROUND OF THE INVENTION

1. Field of the Invention

This invention relates to the system architecture of a computer graphics display system. More particularly this invention relates to verifying the functions of a frame buffer employing a memory display interface.

2. Background

In a typical computer graphics system, a video random access memory (VRAM) frame buffer stores pixel data for a display device. A memory display interface provides pixel processing flexibility in such systems. The memory display interface is coupled to a digital to analog converter (DAC), which generates the video signals for the display device. The memory display interface processes pixel data at programmable pixel rates and pixel depths, and implements programmable pixel functions. Pixel processing at programmable pixel rates enables support of display devices having differing resolutions, and support of VRAM frame buffers having differing access speeds. Also, programmable pixel depths increases software compatibility.

A memory display interface processes pixel data through a set of pixel processing pipelines. The mapping of pixel data stored in the VRAM frame buffer to the pixel processing pipelines varies according to the pixel depth programmed into the memory display interface. The output pixel values generated by the memory display interface vary according to the pixel functions programmed into the memory display interface.

However, the programmable high speed pixel rates of the memory display interface create problems when verifying the VRAM frame buffer and the pixel processing function of the memory display interface. Usually, the processor bus in such system is not synchronized to the pixel busses. Also, a typical processor bus is to slow to read the high frequency data transferred over the pixel busses. Moreover, the multiple pixel processing pipelines within the memory display interface cannot easily be isolated by analyzing the pixel data transferred between the memory display interface and the DAC.

As will be described, the present test mode read back function enables a processor to verify the functions of a VRAM frame buffer and a memory display interface, wherein the memory display interface implements programmable pixel rates, pixel depths, and programmable pixel processing functions.

SUMMARY OF THE INVENTION

A test mode read back function is disclosed for verifying the functions of the memory display interface and a VRAM frame buffer coupled to the memory display interface. The memory display interface implements programmable pixel rates and pixel depths, and programmable pixel processing functions.

The memory display interface receives pixel data from a VRAM frame buffer over a video bus, and performs look-up table functions and programmable pixel functions on the pixel data. Color pixel data from the memory display interface is transferred to a digital to analog converter (DAC), which generates video signals for a display device. Pixel data for multiple pixels is transferred in parallel from the VRAM frame buffer to the memory display interface over the video bus, according to a pixel depth mode.

A processor stores a test pixel value in the VRAM frame buffer. The test pixel value comprises a test mode bit embedded within an X field, and a color value comprising Red, Green, and Blue values. The processor selects a test pipeline from a plurality of pixel processing pipelines in the memory display interface. The pixel processing pipelines perform programmable pixel functions and lookup table functions. A mapping between the pixels stored in the VRAM frame buffer and the pixel processing pipelines is used to determine which processing pipeline should be selected as the test pipeline. The processor selects the test pipeline by accessing a master control register in the memory display interface.

The test pixel value is transferred from the VRAM frame buffer into the test pipeline. The test pipeline processes the test pixel value according to the programmed pixel functions and lookup table functions. The test pipeline generates an output pixel.

A test mode enable signal is generated propagating the test mode bit through a test mode enable pipeline. The test mode enable pipeline implements a delay necessary to latch the output pixel after processing through the test pipeline. The test mode enable signal controls a test mode read back register which latches the output pixel corresponding to the test pixel value. Thereafter, the processor reads the test mode read back register and compares the output pixel with expected results to verify the VRAM frame buffer and the memory display interface.

DETAILED DESCRIPTION OF THE INVENTION

A test mode read back function for verifying the functions of the memory display interface and a VRAM frame buffer coupled to the memory display interface is disclosed, wherein the memory display interface implements programmable pixel rates and pixel depths, and programmable pixel processing functions. In the following description, for purposes of explanation, specific circuit devices, circuit architectures and components are set forth in order to provide a more thorough understanding of the present invention. However, it will be apparent to one skilled in the art that the present invention may be practiced without the Specific details. In other instances while known circuits and devices are shown in schematic form in order not to obscure the present invention unnecessarily.

Figure 1:
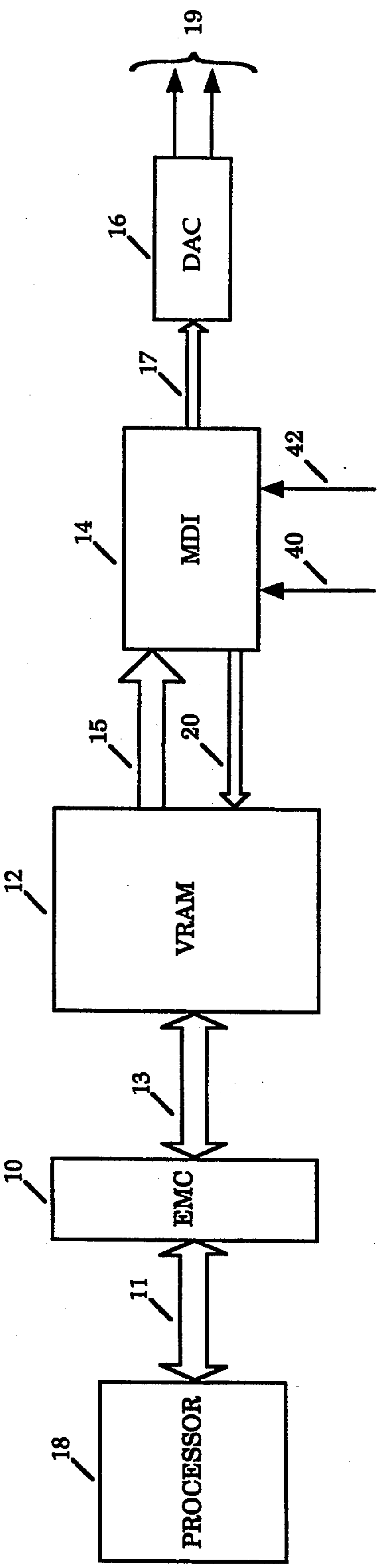
FIG. 1 is a block diagram of a VRAM frame buffer and a memory display interface that employs the teachings of the present invention.

Referring now to FIG. 1, a block diagram of a VRAM frame buffer and a memory display interface is shown. An error correction coding memory controller (EMC) 10 is shown coupled to a microprocessor bus 11. The EMC 10 is a memory controller for a VRAM frame buffer 12. The VRAM frame buffer 12 stores pixel data transferred over the microprocessor bus 11, or generated by an optional enhanced pixel processing memory controller (not shown). The EMC 10 communicates with the VRAM frame buffer 12 over a memory bus 13.

A memory display interface (MDI) 14 performs look-up table functions and programmable pixel functions. The MDI 14 processes the pixel data transferred from the VRAM frame buffer 12 to a digital to analog converter (DAC) 16. In particular, the MDI 14 generates color pixel data for display on a graphics display device (not shown). In the current embodiment, the MDI 14 processes 4 pixels in parallel through a pixel processing pipeline. The pixel processing pipeline comprises 4 parallel pipelines (pipelines A through D).

A processor 18 controls the pixel processing functions of the MDI 14 by programming internal registers of the MDI 14. The internal registers of the MDI 14 determine the pixel width, pixel data rates, as well as programmable pixel functions such as blending and lookup table functions. The processor 18 accesses the internal registers of the MDI 14 over a data bus 40 and an address bus 42. In addition, the processor 18 accesses the lookup tables within the MDI 14 over the data bus 40 and the address bus 42.

In the current embodiment, it is preferable that the data bus 40 comprise 8 bits, and the address bus 42 comprise 2 bits in order to minimize the pin count of the MDI 14. The processor 18 accesses internal registers and lookup tables of the MDI 14 by loading high and low portions of an internal address register over the data bus 40. After loading a base address into the internal address register, the processor 18 performs auto-increment reads and writes to transfer information to the MDI 14.

In particular, the processor 18 accesses a master control register (MCR) and a test mode read back register (TMRBR) in order to control the present test mode read back function. In the current embodiment, bits 4 and 5 of the MCR register determine the pixel depth mode: 32 bit mode, 16 bit mode, and 8 bit mode. Bits 2 and 3 of the MCR select the active pixel processing pipeline for the test mode read back function; pipeline A, pipeline B, pipeline C, or pipeline D. Bit 1 of the MCR determines whether the test mode bit of the test pixel is active high or active low.

The VRAM frame buffer 12 transmits pixel data over a video bus 15 to the MDI 14 on the rising edge of a video shift clock signal (VSCLK) 20. In the current embodiment, the video bus 15 is 128 bits wide, which enables transfer of data for multiple pixels in parallel to the MDI 14. The MDI 14 processes pixels in the three pixel depth modes. In 32 bit mode, the MDI 14 receives 32 bit wide pixel data over the video bus 15. In 16 bit mode, 16 bit wide pixels are received, while in 8 bit mode 8 bit wide pixels are received. Thus, in 32 bit mode, four pixels are transferred to the MDI 14 in parallel over the video bus 15 on the rising edge VSCLK 20. In 16 bit mode, eight pixels are transferred in parallel, and in 8 bit mode, sixteen pixels are transferred in parallel over the video bus 15.

After performing look-up table functions and programmable pixel functions on the pixel data received over the video bus 15, the MDI 14 transfers color pixel data to the DAC 16 over a pixel bus 17. The DAC 16 converts the digital color pixel data into analog signals, and thereby generates video signals 19 for the display device. The video signals 19 comprised red, green, and blue video signals, as well as sync signals for the display device.

Figure 2:
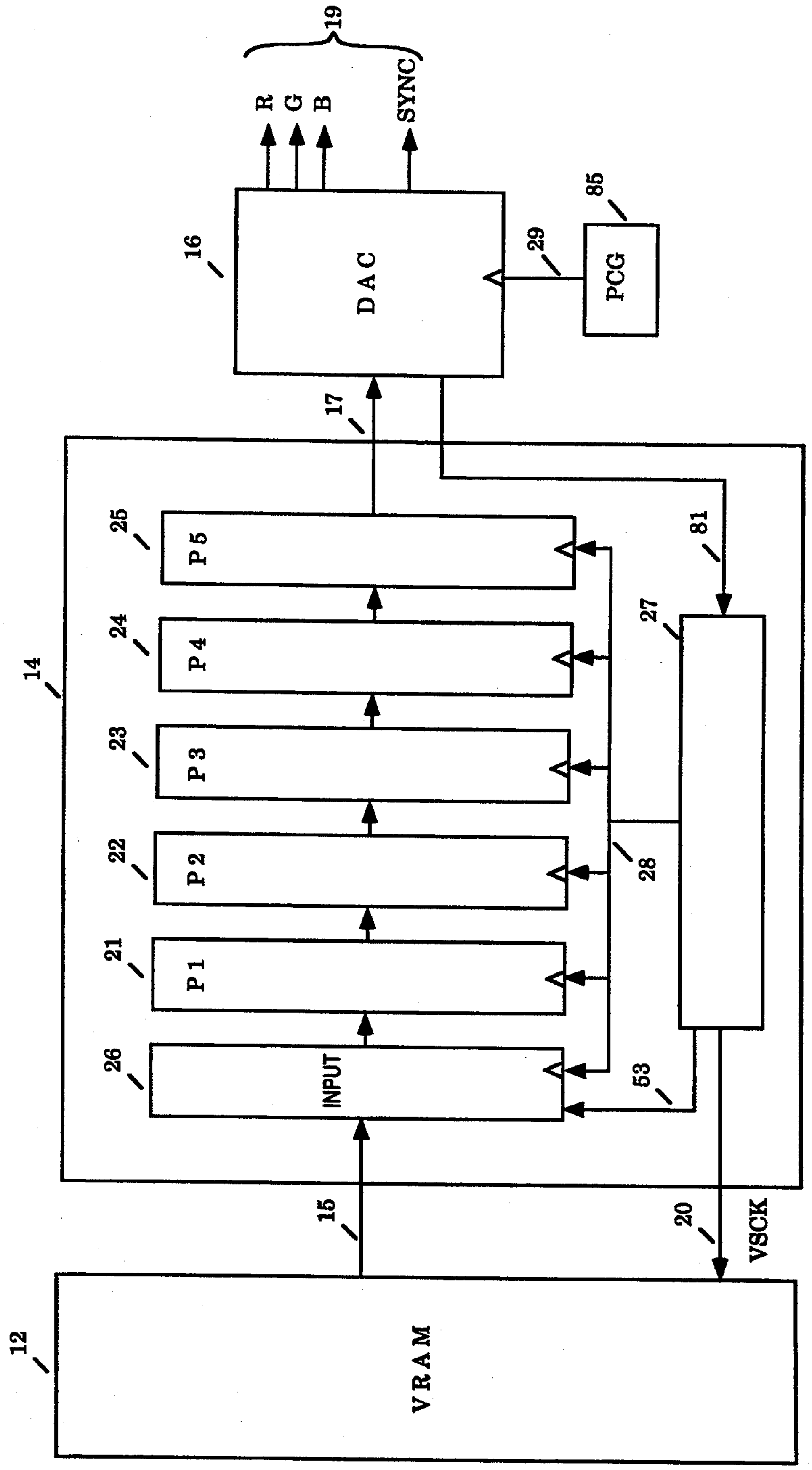
FIG. 2 is a block diagram of the pixel processing functions of the memory display interface, including an input stage, a pixel processing pipeline, and a clock circuit.

Referring now to FIG. 2, a block diagram of the pixel processing function of the MDI 14 is shown, The pixel processing functions are accomplished by an input stage 26, a pixel processing pipeline, and a clock circuit 27. The pixel processing pipeline processes the pixel data received from the VRAM frame buffer 12, and is comprised of a set of pixel processing stages 21–25. The clock circuit 27 generates the clock signals necessary to sequence the pixel data from the video bus 15, through the input stage 26 and the pixel processing pipeline 21–25, and over the pixel bus to the DAC 16.

Pixel data from the VRAM frame buffer 12 is received over the video bus 15 by the input stage 26. Thereafter, the pixel data is sequenced into the pixel processing pipeline 21–25, which processes four pixels in parallel (pipelines A through D) for all three pixel depth modes. The final pixel processing stage 25 contains an output multiplexer for transferring the color pixel data to the DAC 16 over the pixel bus 17. The pixel processing stage 25 multiplexes the color pixel data from four parallel pixels to two parallel pixels for transfer to the DAC 16 over the pixel bus 17.

The video signals 19 from the DAC 16 to the display device are synchronized to a video clock 29, which is generated by a programmable clock generator (PCG) 85. The DAC 16 receives the video clock 29 from the PCG 85, and generates a pixel clock signal 81. The pixel clock signal 81 is synchronized to the video clock 29, and runs at one half the frequency of the video clock 29.

The clock circuit 27 receives the pixel clock 81 from the DAC 16, and generates the VSCLK 20, a pipeline clock 28, and an input control signal 53. The VSCLK 20, the pipeline clock 28, and the input control signal 53 are synchronized to the pixel clock 81 and the video clock 29.

The rising edge of the VSCLK 20 causes the VRAM frame buffer 12 to transfer 128 bits of pixel data to the MDI 14 over the video bus 15. The input control signal 53 sequences the pixel data through the input stage 26, and into the pixel processing pipeline 21–25 according to the pixel depth mode and the frequency of the video clock 29. The pipeline clock 28 is used to sequence the pixel data from the input stage 26 through the pixel processing pipeline 21–25.

The VSCLK 20, the pipeline clock 28, the input control signal 53 and the pixel dock 81 are derived from the video clock 29, and are synchronized to the video clock 29. The frequencies of the VSCLK 20, are determined by the pixel rate required by the displayed device, and by the depth of the pixel data. The frequencies of the pipeline clock 28, and the pixel clock 81 are determined by the pixel rate required by the display device. The pixel rate required by the display device is determined by the frequency of the video clock 29.

For example, a 1600×1280 resolution display device running at 76 Hz requires the video clock 29 frequency of 216 MHz. The DAC 16 divides the video clock 29 by 2, and generates the pixel clock 81 at 108 MHz. The pixel clock 81 runs at one half the frequency of the video clock 29 because color pixel data for two pixels is transferred in parallel over the pixel bus 17, while the video signals 19 transmit one pixel to the display device.

The clock circuit 27 receives the pixel clock 81, and generates the pipeline clock 28 at 54 MHz, which is one half the frequency of the pixel clock 81. The pipeline clock 28 runs at one half the frequency of the pixel clock 81, and at one fourth the frequency of the video clock 29, because pixel data for four pixels is processed in parallel through the pixel processing pipeline 21–25.

The clock circuit 27 generates the VSCLK 20 at a frequency which depends on the pixel depth mode. Four pixels are transferred in parallel over the video bus 15 in 32 mode, while four pixels are processed in parallel through the pixel processing pipeline 21–25. Therefore the VSCLK 20 and the pipeline clock 28 runs at the same frequency in 32 bit mode. In this example for 32 bit mode, the VSCLK 20 is generated and 54 MHz, which is equal to the frequency of the pipeline clock 28.

In 16 bit mode, pixels are transferred in parallel over the video bus 15, while only pixels are processed in parallel through the pixel processing pipeline 21–25. As a consequence, the clock circuit 27 generates the VSCLK 20 at one half the frequency of the pipeline clock 28, or 27 MHz in this example. In 8 bit mode, sixteen pixels are transferred in parallel over the video bus 15, while four pixels are processed in parallel through the pixel processing pipeline 21–25. Thus, for 8 bit mode, the clock circuit 27 generates the VSCLK 20 at one fourth the frequency of the pipeline clock, or 13.5 MHz.

For another example, a 1280×1024 resolution display device running at 76 Hz requires the video clock 29 frequency of 135 MHz. The DAC 16 generates the pixel clock 81 at 67.5 MHz, which is one half the frequency of the video clock 29. The clock circuit 27 generates the pipeline clock 28 at 33.75 MHz, which is one half the frequency of the pixel clock 81. The clock circuit 27 generates the VSCLK 20 at 33.75 MHz in 32 bit mode, at 16.875 MHz in 16 bit mode, and 8.4375 MHz in 8 bit mode.

Figure 3:
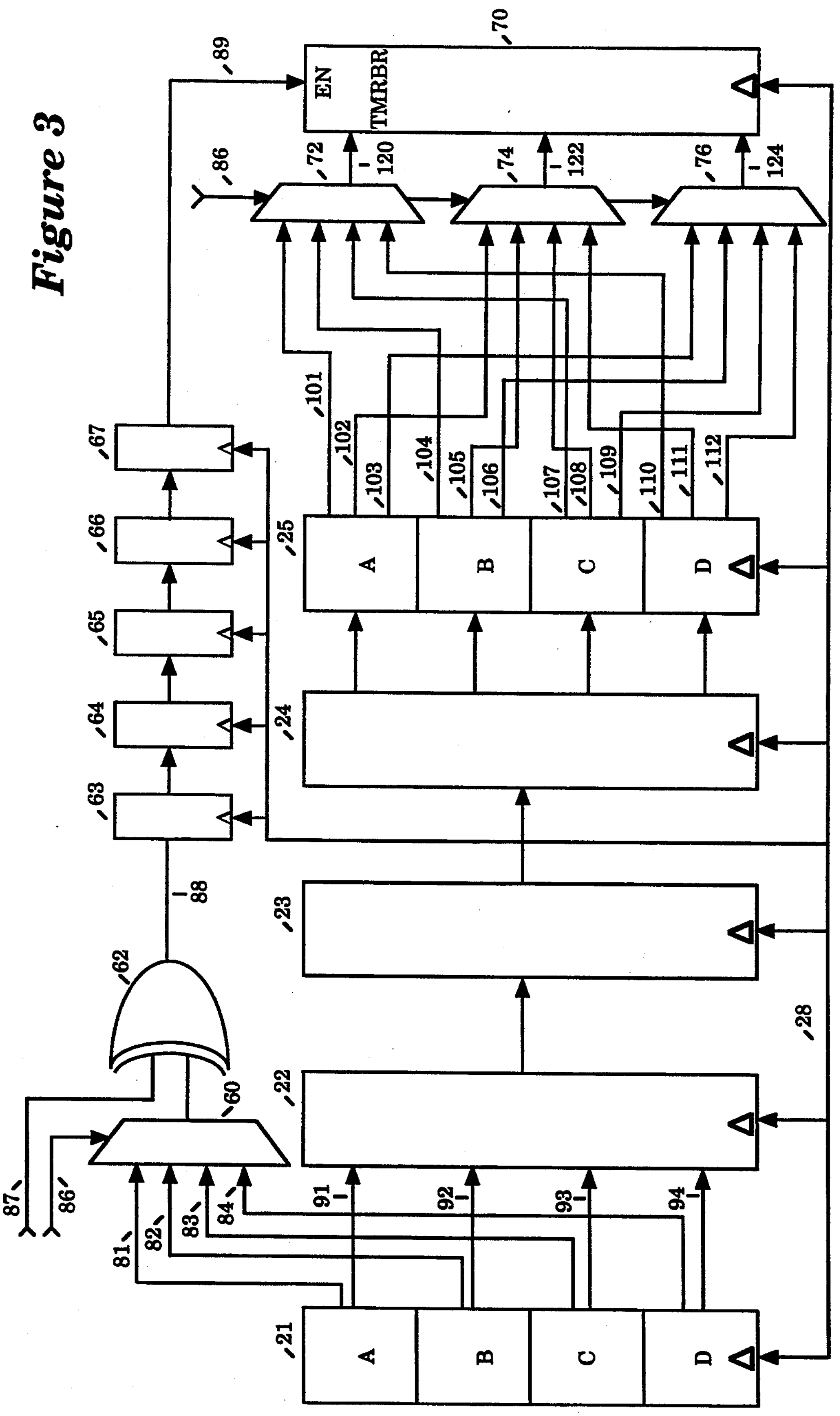
FIG. 3 is a block diagram illustrating the test mode read back circuitry, and shows pipelines A through D of the pixel processing pipeline, as well as the test mode bit pipeline.

FIG. 3 is a block diagram illustrating the test mode read back circuitry. The pixel processing pipeline stage 21 is shown comprising pipelines A through D. The pipeline clock 28 synchronizes the pixel data flow through the pixel processing pipeline 21–25. The pipeline clock 28 synchronizes the pipelines A through D concurrently.

In 32 bit mode, the pixel values received by the pixel processing pipeline stage 21 comprises an 8 bit X value and a 24 bit color value. The X value controls lookup table functions and programmable pixel functions. The X value also contains the test mode bit for the test mode read back function. The 24 bit color value comprises 8 bit Red, 8 bit Green, and 8 bit Blue values.

Each of the pipelines A through D of the pixel processing pipeline stage 21 receives and X value and a color value for a corresponding pixel value. The pixel processing pipeline stage 21 receives pixel values for the pipelines A through D on each cycle of the pipeline clock 28. The pixel processing pipeline stage 21 transmits a pipeline A color value 91, a pipeline B color value 92, a pipeline C color value 93, and a pipeline D color value 94 to the pixel processing pipeline stage 22. The pipeline A color value 91, the pipeline B color value 92, the pipeline C color value 93, and the pipeline D color value 94 are processed in parallel through the pixel processing stages 22–24 synchronized by the pipeline clock 28. The pixel processing stage 25 holds Red, Green, and Blue values corresponding to output pixels for each of the pipelines A through D.

A multiplexor 60 is coupled to receive the test mode bits embedded within the X values of the pixel values received by the pipelines A through D. The multiplexor 60 receives a pipeline A test mode bit 81, a pipeline B test mode bit 82, a pipeline C test mode bit 83, and a pipeline D test mode bit 84. A control signal 86 corresponds to bits 2 and 3 of the MCR. The control signal 86 causes the multiplexor 60 to selectively couple the test mode bits 81–84 to an input of an XOR logic gate 62, thereby selecting an active pipeline for the test mode read back function.

The test mode bit 81–84 selected by the control signal 86 is XOR'd with a control signal 87 control signal 87 corresponds to bit 1 of the MCR, which determines whether the test mode bit is active high or active low. The XOR gate 62 generates a test mode read back register enable signal (TMRBR enable) 88.

The TMRBR enable 88 propagates through a set of test mode bit pipeline delay stages 63 through 66. Each of the test mode bit pipeline delay stages 63–66 is synchonized by the pipeline clock 28. A delayed TMRBR enable 89 is coupled to a write enable input of a test mode read back register (TMRBR) 70.

A multiplexor 72 is coupled to receive a pipeline A Red value 101, a pipeline B Red value 104, a pipeline C Red value 107, and a pipeline D Red value 110 from the pixel processing stage 25. The multiplexor 72 selectively couples the pipeline Red value 101, the pipeline B Red value 104, the pipeline C Red value 107, and the pipeline D Red value 110 to a Red input 120 to the TMRBR 70.

A multiplexor 74 is coupled to receive a pipeline A Green value 102, a pipeline B Green value 105, a pipeline C Green value 108, and a pipeline D Green value 111 from the pixel processing stage 25. The multiplexor 74 selectively couples the pipeline A Green value 102, the pipeline B Green value 105, the pipeline C Green value 108, and the pipeline D Green value 111 to a Green input the TMRBR 70. Similarly, a multiplexor 76 selectively couples a pipeline A Blue value 103, a pipeline B Blue value 106, a pipeline C Blue value 109, and a pipeline D Blue value 112 to a Blue input 124 to the TMRBR 70.

The multiplexors 72, 74, and 76 selectively couple the Red, Green, and Blue output pixel values from the pipelines A through D to the TMRBR 70 according to the control signal 86. The delayed TMRBR enable 89 corresponding to the output pixel values enables writing of the Red input 120, Green input 122, and Blue input 124 into the TMRBR 70. The TMRBR 70 is synchronized by the pipeline clock 28. Thereafter, the contents of the TMRBR 70 can be read by the the processor 18 over the data bus 40 in order to verify the MDI 14 and the VRAM frame buffer 12.

Figure 4:
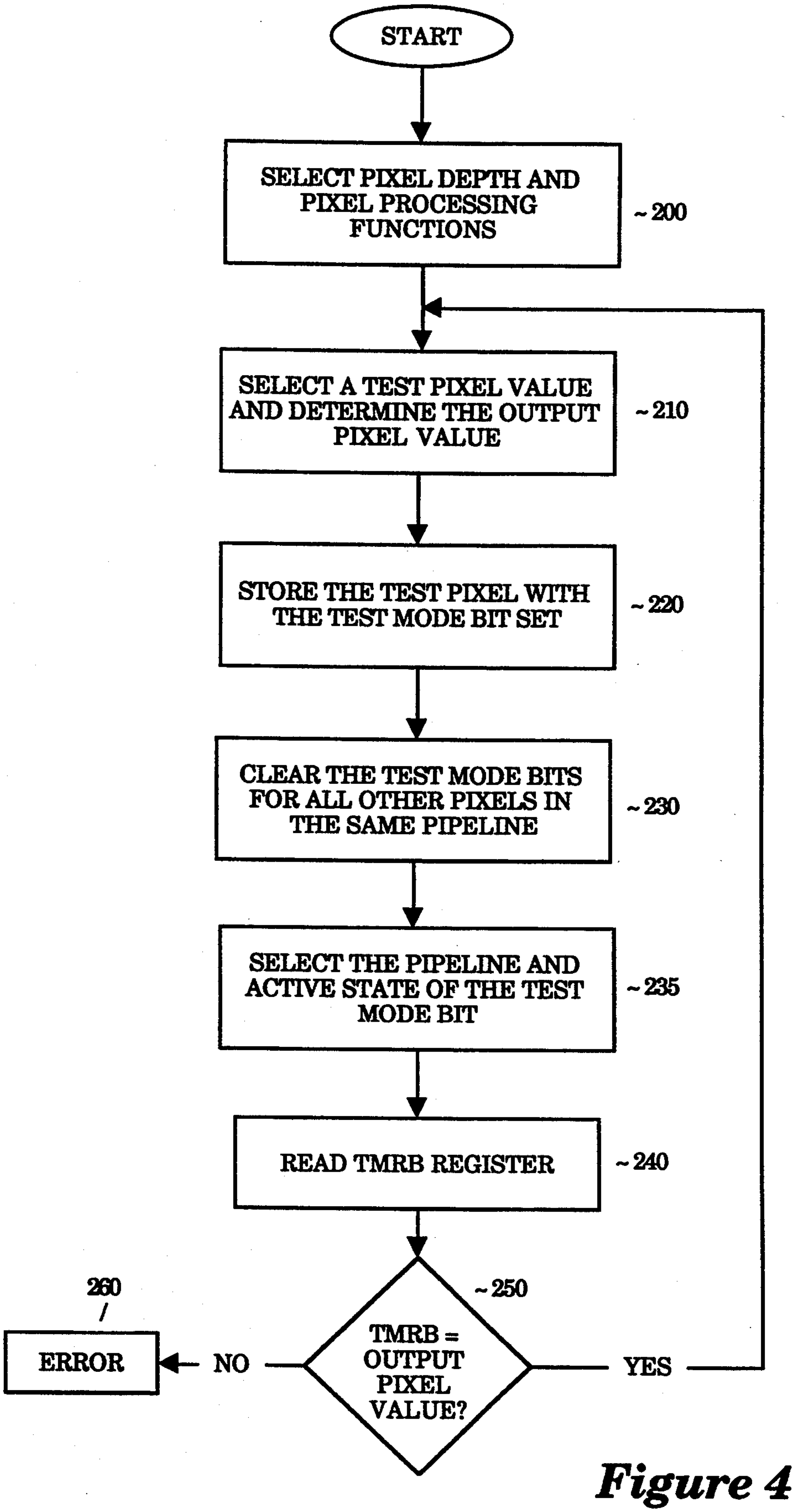
FIG. 4 is a flow diagram illustrating a method for verifying the VRAM frame buffer and the memory display interface using the test mode read back function.

FIG. 4 is a flow diagram illustrating a method for verifying the VRAM frame buffer 12 and the MDI 14 using the test mode read back function. At block 200, the processor 18 programs the pixel depth by writing to the MCR of the MDI 14. The processor 18 also selects programmable pixel processing functions by programming registers in the MDI 14, and loads lookup tables contained in the MDI 14.

At block 210, a test pixel value is selected, and the corresponding output pixel value is determined. The output pixel value is determined according to the programmable pixel functions and lookup table functions programmed into the MDI 14 at block 200. For example, the output pixel value may be a simple lookup table function of the test pixel value according the programmed lookup table functions.

At block 220, the processor 18 stores the test pixel value in the VRAM frame buffer 12 with the test mode bit of the X value set. At block 220, the processor 18 clears the test mode bits in the X values of all the other pixels stored in the VRAM frame buffer 12 corresponding to the same pipeline (from among pipeline A–D) of the test pixel value. The processor 18 may perform a mapping of the VRAM frame buffer 12 to the pipelines A–D in order to determine the test mode bits that are cleared.

At block 235, the processor 18 selects an active test mode pipeline corresponding to the test pixel value stored in the VRAM frame buffer 12 by accessing bits 4 and 5 of the MCR in the MDI 14. Also, the processor 18 selects the active state of the test mode bit by accessing bit 1 of the MCR.

Thereafter, the MDI 14 generates the VSCLK 20 to transfer pixel data from the VRAM frame buffer 12 into the pipelines A–D. The pixel data corresponding to the active test mode pipeline is processed through the pixel processing stages 21–25 and selectively coupled to the TMRBR 70 by the multiplexors 72, 74 and 76. However, only the output pixel data corresponding to the test pixel value is loaded into the TMRBR 70 since the test pixel value is the only pixel data in the active test mode pipeline having the test mode bit set.

At block 250, the processor 18 reads the contents of the TMRBR 70, which holds the output pixel data corresponding to the test pixel. The processor compares the contents of the TMRBR 70 to the output pixel value determined at block 210. At decision block 250, if the contents of TMRBR 70 do not match the output pixel value, control proceeds to block 260 to signal an error. Otherwise, control proceeds back to block 210 to select another test pixel value and continue testing.

In the foregoing specification the invention has been described with reference specific exemplary embodiments thereof. It will, however, be evident that various modifications and changes may be made thereto without departing from the broader spirit and scope of the invention as set forth in the appended claims. The specifications and drawings are accordingly to be regarded as illustrative rather than restrictive.

What is claimed is:

1. A method for testing a memory display interface, comprising the steps of:

(a) storing a test pixel value in a VRAM frame buffer, the test pixel value comprising a test mode and a color value;

(b) selecting a test pipeline from a plurality of pixel processing pipelines in the memory display interface, the pixel processing pipelines performing a plurality of pixel processing functions and lookup table functions;

(c) transferring the test pixel value from the VRAM frame buffer to the test pipeline;

(d) generating output pixel value by processing the color value through the test pipeline;

(e) generating a test mode enable signal that synchronizes the test mode enable signal to the output pixel value by propagating the test mode bit through a test mode enable pipeline that matches a pipeline depth of the test pipeline;

(f) latching the output pixel value according to a state of the test mode enable signal;

(g) reading the output pixel value to verify the pixel processing functions and lookup table functions.

2. The method of claim 1, wherein the test pixel value comprises an X value and the color value, the X value comprising the test mode bit and a plurality of bits for controlling the pixel processing functions and the lookup table functions.

3. The method of claim 2, wherein step (b) comprises the steps of:

determining the test pipeline by mapping a test pixel storage location in the VRAM frame buffer to the pixel processing pipelines of the memory display interface, the test pixel storage location corresponding to the test pixel value in the VRAM frame buffer;

selecting the test pipeline by accessing a master control register of the memory display interface.

4. The method of claim 3, wherein step (c) comprises the step of transferring a plurality of pixel values including the test pixel value to the pixel processing pipelines in parallel synchronized by a shift clock signal, such that each pixel processing pipeline receives one of the pixel values during each period of the shift clock signal, each pixel value comprising the X value and the color value.

5. The method of claim 4, further comprising the step of selecting an active state for the test mode bit by accessing an active state bit of the master control register of the memory display interface.

6. The method of claim 5, wherein step (e) comprises the steps of:

accessing the master control register to determine the test pipeline and the active state for the mode bit;

generating the test mode enable signal equal to an exclusive OR of the test mode bit of the X value corresponding to the test pipeline with active state bit;

delaying the test mode enable signal through the test mode enable pipeline to match a delay of the output pixel value through the test pipeline.

7. The method of claim 6, wherein propagation of the pixel values through the pixel processing pipelines and propagation of the test mode enable signal through the test mode enable pipeline are synchronized by a pipeline clock signal.

8. The method of claim 7, wherein the test mode bit of the X value corresponding to the test pixel value is in the active state, and the test mode bit of the X values corresponding to the pixel values are not in the active state.

9. An apparatus for testing a memory display interface, comprising:

means for storing a test pixel value in a VRAM frame buffer, the test pixel value comprising a test mode bit and a color value;

means for selecting a test pipeline from a plurality of pixel processing pipelines in the memory display interface, the pixel processing pipelines performing a plurality of pixel processing functions and lookup table functions;

means for transferring the test pixel value from the VRAM frame buffer to the test pipeline;

means for generating an output pixel value by processing the color value through the test pipeline;;

means for generating a test mode enable signal that synchronizes the output pixel value that corresponds to the test pixel value by propagating the test mode bit through a test mode enable pipeline that matches a pipeline depth of the test pipeline;
means for latching the output pixel value according to a state of the test mode enable signal;
means for reading the output pixel value to verify the pixel processing functions and lookup table functions.

10. The apparatus of claim 9, wherein the test pixel value comprises an X value and the color value, the X value comprising the test mode bit and a plurality of bits for controlling the pixel processing functions and the lookup table functions.

11. The apparatus of claim 10, wherein the means for selecting a test pipeline comprises:
means for determining the test pipeline by mapping a test pixel storage location in the VRAM frame buffer to the pixel processing pipelines of the memory display interface, the test pixel storage location corresponding to the test pixel value in the VRAM frame buffer;
means for selecting the test pipeline by accessing a master control register of the memory display interface.

12. The apparatus of claim 11, wherein the means for transferring the test pixel value from the VRAM frame buffer to the test pipeline comprises means for transferring a plurality of pixel values including the test pixel value to the pixel processing pipelines in parallel synchronized by a shift clock signal, such that each pixel processing pipeline receives one of the pixel values during each period of the shift clock signal, each pixel value comprising the X value and the color value.

13. The apparatus of claim 12, further comprising means for selecting an active state for the test mode bit by accessing an active state bit of the master control register of the memory display interface.

14. The apparatus of claim 13, wherein the means for generating a test mode enable signal comprises:
means for accessing the master control register to determine the test pipeline and the active state for the test mode bit;
means for generating the test mode enable signal equal to an exclusive OR of the test mode bit of the K value corresponding to the test pipeline with active state bit;
means for delaying the test mode enable signal through the test mode enable pipeline to match a delay of the output pixel value through the test pipeline.

15. The apparatus of claim 14, wherein propagation of the pixel values through the pixel processing pipelines and propagation of the test mode enable signal through the test mode enable pipeline are synchronized by a pipeline clock signal.

16. The apparatus of claim 15, wherein the test mode bit of the X value corresponding to the test pixel value is in the active state, and the test mode bit of the X values corresponding to the pixel values are not in the active state.

17. A display interface with a test mode, comprising:
a plurality of pixel processing pipelines each capable of generating a series of output pixel values by performing a plurality of pixel processing functions and lookup table functions each of a series of input pixel values including a test pixel value;
input circuit coupled to access the input pixel values including the test pixel value from a VRAM frame buffer, the test pixel value comprising a test mode bit and a test color value;
control register that selects a test pipeline for the test mode from among the pixel processing pipelines;
test mode enable pipeline that generates a test mode enable signal by synchronizing the test enable signal to the output pixel value that corresponds to the test pixel value;
register that latches the output pixel value that corresponds to the test pixel value under control the test mode enable signal.

18. The display interface of claim 17, wherein the test pixel value comprises an X value and a color value, the X value comprising the test mode bit and a plurality of bits for controlling the pixel processing functions and the lookup table functions the color value.

19. The memory display interface of claim 18, wherein the input circuit comprises circuitry for transferring the pixel values including the test pixel value into the pixel processing pipelines in parallel synchronized by a shift clock signal, such that each pixel processing pipeline receives one of the pixel values during each period of the shift clock signal.

20. The memory display interface of claim 17, wherein the control register stores an active state bit that selects an active state for the test mode bit.

21. The memory display interface of claim 20, wherein the test mode enable pipeline comprises:
circuit for accessing the control register to determine the test pipeline and the active state for the test mode bit;
circuit for generating the test mode enable signal equal to an exclusive OR of the test mode bit of the X value corresponding to the test pipeline with active state bit;
circuit for delaying the test mode enable signal to synchronize the test mode enable signal to the output pixel value.

22. The memory display interface of claim 21, wherein propagation of the pixel values through the pixel processing pipelines and propagation of the test mode enable signal through the test mode enable pipeline are synchronized by a pipeline clock signal.

* * * * *

UNITED STATES PATENT AND TRADEMARK OFFICE
CERTIFICATE OF CORRECTION

PATENT NO. : 5,404,318

DATED : April 04, 1995

INVENTOR(S) : Hoffert et al.

It is certified that error appears in the above-identified patent and that said Letters Patent is hereby corrected as shown below:

In column 7, claim 1 at line 51, please delete " mode " and insert -- mode bit --.

In column 7, claim 1 at line 64, please delete " value " and insert -- value that corresponds to the test pixel value --.

In column 8, claim 9 at line 67, please delete " synchronizes " and insert -- synchronizes the test mode enable signal to --.

In column 9, claim 14 at line 44, please delete " K " and insert -- X --.

In column 10, claim 17 at line 4, please delete " A display " and insert -- A memory display --.

In column 10, claim 18 at line 24, please delete "The display" and insert --The memory display--.

UNITED STATES PATENT AND TRADEMARK OFFICE

CERTIFICATE OF CORRECTION

PATENT NO. : 5,404,318

DATED : April 04, 1995

INVENTOR(S) : Hoffert et al.

It is certified that error appears in the above-identified patent and that said Letters Patent is hereby corrected as shown below:

Column 8, line 65, delete --;-- (second occurrence).

Signed and Sealed this

Ninth Day of March, 1999

Attest:

Q. TODD DICKINSON

Attesting Officer

*Acting Commissioner of Patents and Trademarks*